(12) United States Patent
Wu

(10) Patent No.: US 9,829,738 B2
(45) Date of Patent: Nov. 28, 2017

(54) DISPLAY PANEL AND DISPLAY DEVICE

(71) Applicant: BOE TECHNOLOGY GROUP CO., LTD., Beijing (CN)

(72) Inventor: Yanbing Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/905,408

(22) PCT Filed: Jun. 19, 2015

(86) PCT No.: PCT/CN2015/081986
§ 371 (c)(1),
(2) Date: Jan. 15, 2016

(87) PCT Pub. No.: WO2016/115820
PCT Pub. Date: Jul. 28, 2016

(65) Prior Publication Data
US 2016/0377911 A1 Dec. 29, 2016

(30) Foreign Application Priority Data
Jan. 19, 2015 (CN) .......................... 2015 1 0026122

(51) Int. Cl.
G02F 1/1333 (2006.01)
G02F 1/1335 (2006.01)
(Continued)

(52) U.S. Cl.
CPC ......... *G02F 1/133504* (2013.01); *G02B 6/00* (2013.01); *G02F 1/1339* (2013.01);
(Continued)

(58) Field of Classification Search
None
See application file for complete search history.

(56) References Cited

U.S. PATENT DOCUMENTS 7,349,041 B2 3/2008 Yamamura
7,611,262 B2 11/2009 Chang
(Continued)

FOREIGN PATENT DOCUMENTS

CN 1412609 A 4/2003
CN 101126821 A 2/2008
(Continued)

OTHER PUBLICATIONS

International Search Report of PCT/CN2015/081986 in Chinese, dated Oct. 13, 2015 with English translation.
(Continued)

*Primary Examiner* — Ryan Crockett
(74) *Attorney, Agent, or Firm* — Collard & Roe, P.C.

(57) ABSTRACT

A display panel and a display device are provided. The display panel comprises an upper substrate (10) and a lower substrate (20) cell-assembled, the lower substrate (20) including a base substrate (200), the base substrate (200) including an upper surface (202) close to the upper substrate (10) and a lower surface (203) opposite to the upper surface (202), scattering microstructures (205) being arranged on the lower surface (203) of the base substrate, and a display functional layer being arranged on the upper surface (202) of the base substrate. The display panel can solve a problem that a display device in the prior art cannot meet requirements of ultra-thinning and low cost.

17 Claims, 2 Drawing Sheets

(51) Int. Cl.
*G02F 1/1339* (2006.01)
*G02B 6/00* (2006.01)

(52) U.S. Cl.
CPC .. *G02F 1/133514* (2013.01); *G02F 1/133553* (2013.01); *G02F 1/133512* (2013.01); *G02F 2001/133302* (2013.01)

(56) References Cited

U.S. PATENT DOCUMENTS

| | | | |
|---|---|---|---|
| 7,950,815 B2 | 5/2011 | Jin et al. | |
| 8,072,564 B2 | 12/2011 | Seki et al. | |
| 8,634,041 B2 | 1/2014 | Yamazaki et al. | |
| 9,057,913 B2 | 6/2015 | Huang | |
| 2003/0067565 A1* | 4/2003 | Yamamura | G02F 1/133528 349/65 |
| 2006/0098140 A1 | 5/2006 | Lee | |
| 2008/0309861 A1* | 12/2008 | Seki | G02F 1/133555 349/117 |
| 2009/0073691 A1 | 3/2009 | Shibasaki et al. | |
| 2009/0159786 A1 | 6/2009 | Yang et al. | |
| 2010/0208178 A1* | 8/2010 | Hayano | G02F 1/133512 349/106 |
| 2011/0090672 A1* | 4/2011 | Zhu | G02B 6/0018 362/97.1 |
| 2011/0109839 A1* | 5/2011 | Zhu | G02F 1/133603 349/62 |
| 2013/0094243 A1* | 4/2013 | Wu | G02B 6/0036 362/606 |
| 2013/0242226 A1* | 9/2013 | Jeong | G06F 1/1637 349/58 |
| 2014/0092334 A1* | 4/2014 | Ishikawa | G02F 1/133512 349/42 |
| 2014/0327859 A1 | 11/2014 | Momose et al. | |
| 2014/0340364 A1 | 11/2014 | Tang et al. | |
| 2015/0160529 A1* | 6/2015 | Popovich | G02F 1/292 359/200.8 |
| 2015/0183955 A1* | 7/2015 | Deno | G03F 7/0007 349/110 |
| 2015/0369999 A1 | 12/2015 | Wu | |
| 2016/0349570 A1* | 12/2016 | Wu | G02F 1/133504 |
| 2016/0377911 A1 | 12/2016 | Wu | |

FOREIGN PATENT DOCUMENTS

| | | |
|---|---|---|
| CN | 101324720 A | 12/2008 |
| CN | 101514781 A | 8/2009 |
| CN | 102073164 A | 5/2011 |
| CN | 102354067 A | 2/2012 |
| CN | 102998841 A | 3/2013 |
| CN | 103309083 A | 9/2013 |
| CN | 103472941 A | 12/2013 |
| CN | 103631050 A | 3/2014 |
| CN | 104110650 A | 10/2014 |
| CN | 104280933 A | 1/2015 |
| CN | 104536202 A | 4/2015 |
| JP | 2013-097954 A | 5/2013 |
| KR | 10-2008-0038923 A | 5/2008 |
| TW | 201409118 A | 3/2014 |

OTHER PUBLICATIONS

Notice of Transmittal of the International Search Report of PCT/CN2015/081986 in Chinese, dated Oct. 13, 2015.
Written Opinion of the International Searching Authority of PCT/CN2015/081986 in Chinese, dated Oct. 13, 2015 with English translation.
Chinese Office Action in Chinese Application No. 201510026122.2, dated Feb. 5, 2016 with English translation.
Second Chinese Office Action in Chinese Application No. 201510026122.2, dated Oct. 10, 2016 with English translation.
International Search Report of PCT/CN2015/074503 in Chinese, dated Jun. 29, 2015 with English translation.
Notice of Transmittal of the International Search Report of PCT/CN2015/074503 in Chinese, dated Jun. 29, 2015.
Written Opinion of the International Searching Authority of PCT/CN2015/074503 in Chinese, dated Jun. 29, 2015 with English translation.
First Chinese Office Action in Chinese Application No. 201410564478.7, dated Sep. 5, 2016 with English translation.
Second Chinese Office Action in Chinese Application No. 201410564478.7, dated Feb. 15, 2017 with English translation.
Office Action in U.S. Appl. No. 14/770,907 dated Mar. 3, 2017.
Third Chinese Office Action in Chinese Application No. 201510026122.2, dated Apr. 19, 2017 with English translation.
English translation of the International Preliminary Report on Patentability and Written Opinion of the International Searching Authority of PCT/CN2015/081986, dated Jul. 25, 2017.
Final Office Action in U.S. Appl. No. 14/770,907 dated Jul. 5, 2017.
Fourth Chinese Office Action in Chinese Application No. 20150026122.2, dated Sep. 29, 2017 with English translation.

* cited by examiner

| Angle (degree) | Height/bottom radius of cone (mm/mm) | Light flux (lumen) |
|---|---|---|
| 53 | 1/0.5 | 0.038195 |
| 60 | 0.86/0.5 | 0.033313 |
| 90 | 0.5/0.5 | 0.037269 |
| 100 | 0.4/0.5 | 0.037395 |
| 120 | 0.3/0.5 | 0.037091 |
| 140 | 0.2/0.5 | 0.023055 |
| 150 | 0.13/0.5 | 0.009845 |

DISPLAY PANEL AND DISPLAY DEVICE

CROSS REFERENCE TO RELATED APPLICATIONS

This application is the National Stage of PCT/CN2015/081986filed on Jun. 19, 2015, which claims priority under 35 U.S.C. §119 of Chinese Application No. 201510026122.2 filed on Jan. 19, 2015, the disclosure of which is incorporated by reference.

TECHNICAL FIELD

Embodiments of the present disclosure relate to a display panel and a display device.

BACKGROUND

Currently, a Liquid Crystal Display (LCD) is widely used in social life. As everyone knows, a liquid crystal molecule does not have a light-emitting property, so the LCD requires a backlight for displaying. At present, a side-type backlight has occupied a mainstream market of small- and medium-sized LCDs.

The side-type backlight usually includes a light guide plate and a light-emitting body, wherein, the light-emitting body is arranged on a side surface of the light guide plate. Since the light-emitting body is generally a line light source or a point light source, for example, the line light source includes a Cold Cathode Fluorescent Light (CCFL), and the point light source includes a Light-Emitting Diode (LED), the light guide plate is mainly used for converting the line light source or the point light source to a surface light source, so as to improve luminous uniformity of the backlight, to further improve a display effect of a display device.

For example, as shown in FIG. 1, the display device mainly comprises an upper substrate 10, a lower substrate 20, a liquid crystal layer 30 located between the upper substrate 10 and the lower substrate 20, and a backlight 40 located below the lower substrate 20. An upper polarizer 101 is arranged above the upper substrate 10, and a lower polarizer 201 is arranged below the lower substrate 20. The backlight 40 includes a light guide plate 401, and a light-emitting diode 402 arranged on a side surface of the light guide plate 401. Light emitted by the light-emitting diode 402 is converted to light from a surface light source through multiple reflections to be emitted from an upper surface of the light guide plate 401 and irradiate the lower substrate 20 after entering the light guide plate 401 through the side surface of the light guide plate 401.

In a common display device, a light guide plate is relatively thick and expensive. With even less space resource, strict control of businessmen on production cost and severe demands of users on portability, it is hard for the common display device to meet requirements of ultra-thinning and low cost.

SUMMARY

Embodiments of the present disclosure provide a display panel and a display device, for solving a problem that a display device in the prior art cannot meet requirements of ultra-thinning and low cost.

An embodiment of the present disclosure provides a display panel, and the display panel comprises an upper substrate and a lower substrate cell-assembled, the lower substrate including a base substrate, the base substrate including an upper surface close to the upper substrate and a lower surface opposite to the upper surface, scattering microstructures being arranged on the lower surface of the base substrate, and a display functional layer being arranged on the upper surface of the base substrate.

An embodiment of the present disclosure further provides a display device, and the display device comprises a light-emitting body and any display panel provided by an embodiment of the present disclosure.

BRIEF DESCRIPTION OF THE DRAWINGS

In order to clearly illustrate the technical solution in the embodiments of the present disclosure or in the prior art, the drawings necessary for description of the embodiments or the prior art will be briefly described hereinafter; it is obvious that the described drawings are only related to some embodiments of the present disclosure, for which one ordinarily skilled in the art still can obtain other drawings without inventive work based on these drawings.

DETAILED DESCRIPTION

Hereinafter, the technical solutions of the embodiments will be described in a clearly and fully understandable way in conjunction with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

It should be noted that, terms "above", "below" in embodiments of the present disclosure are based on a travelling direction of light; a layer structure or a film which light goes through first is located below; and a layer structure or a film which light goes through later is located above.

Figure 1:
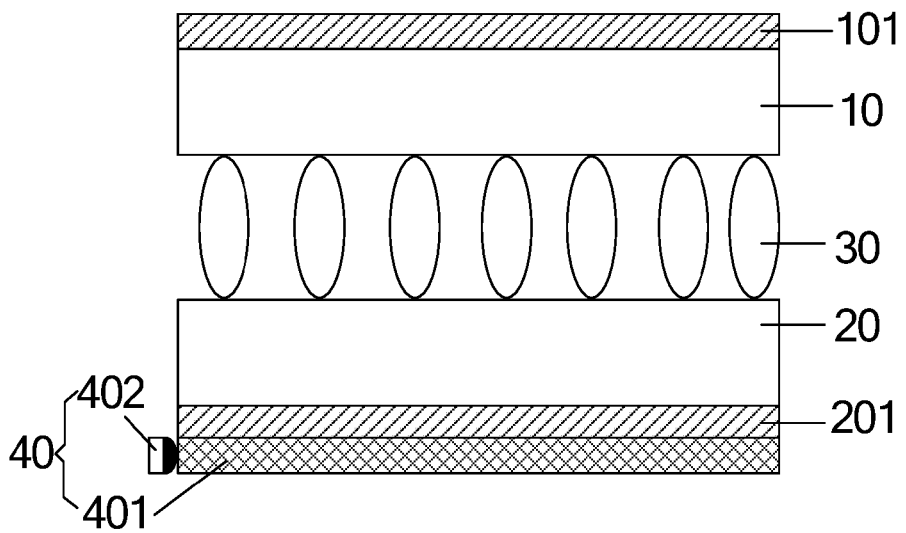
FIG. 1 is a structural schematic diagram of a display device.
Figure 2:
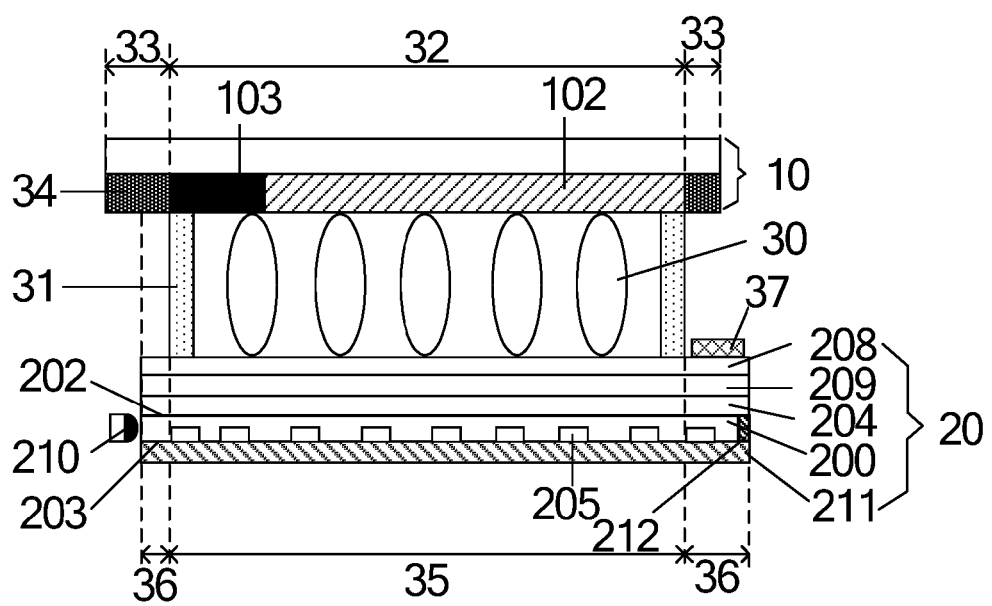
FIG. 2 is a structural schematic diagram of a display device provided by an embodiment of the disclosure.

An embodiment of the present disclosure provides a display panel, as shown in FIG. 2, comprising an upper substrate 10 and a lower substrate 20 cell-assembled, the lower substrate 20 including a base substrate 200, the base substrate 200 including an upper surface 202 close to the upper substrate 10 and a lower surface 203 opposite to the upper surface 202, scattering microstructures 205 being arranged on the lower surface 203 of the base substrate 200, and a display functional layer being arranged on the upper surface 202 of the base substrate 200.

For example, at least one side of the upper substrate 10 protrudes out of the lower substrate 20.

It should be noted that, in actual application, the upper substrate and the lower substrate are usually rectangles, so in an embodiment of the present disclosure at least one side of the upper substrate protrudes out of the lower substrate, that is, at least one side edge of the upper substrate protrudes out of the lower substrate. Embodiments and drawings of the present disclosure only take an example that the upper substrate and the lower substrate are rectangles, and one side edge of the upper substrate protrudes out of the lower substrate for description, but is not limited thereto. Specific shapes of the upper substrate and the lower substrate are not limited, either. For example, the upper substrate and the lower substrate may also be other shapes such as a diamond, a square and so on. And, shape and size of a portion of the upper substrate protruding out of the lower substrate are not limited here. The protruding portion may be a rectangle, or may be in other shapes.

In the display panel described above, a structure of the display functional layer may include a polarizing layer 204 as shown in FIG. 2, and may further include an insulating layer 209, and an array layer 208, which is not particularly limited. In addition, a type of the display panel is not limited here, either. That is, the display panel may be a display panel of Twisted Nematic (TN) mode, may be a display panel of Advanced Super Dimension Switch (ADS) mode, or may be a display panel of In-Plane Switching (IPS) mode. Meanwhile, layer structures of the upper substrate and the lower substrate are not specifically limited, either. For example, the upper substrate may be a layer structure including a black matrix, a common electrode layer and the like. The lower substrate may be a layer structure including a polarizing layer, a thin film transistor, a pixel electrode layer, a passivation layer and the like, which will not be repeated here.

By using scattering microstructures arranged on the lower surface of the base substrate, the lower substrate of the display panel makes light entering through the lower surface or a side surface of the base substrate scattered to form a surface light source after the light irradiates to the scattering microstructures, and emitted from the upper surface, so that brightness of the emitted light is more uniform, and further a display effect of the display panel is better.

Further, as shown in FIG. 2, the upper substrate 10 and the lower substrate 20 are cell-assembled by a sealant 31. The upper substrate 10 includes a first region 32 and a second region 33. The first region 32 corresponds to a region within the sealant 31, and the second region 33 corresponds to a region outside the sealant 31. The second region 33 is connected with at least one side of the first region 32. A light shielding film 34 is arranged on a surface close to the lower substrate 20 in the second region 33 of the upper substrate 10 in a direction protruding out of the lower substrate 20.

It should be note that, a light shielding film is arranged on a surface close to the lower substrate in the second region of the upper substrate in a direction protruding out of the lower substrate, that is, the portion of the upper substrate protruding out of the lower substrate is located in the second region, and a light shielding film is arranged on a surface of the protruding portion close to the lower substrate. Since at least one side edge of the upper substrate protrudes out of the lower substrate, the second region at least has one portion protruding out of the lower substrate. Further, for example, a light shielding film may be arranged on all surfaces close to the lower substrate in the second region of the upper substrate. Thus, in a display device comprising the display panel, light irradiating towards other regions except the first region of the upper substrate can be blocked, thereby avoiding light leakage of the display device.

Further, for example, as shown in FIG. 2, a color filter layer 102 and a black matrix film layer 103 may be arranged on a surface of the upper substrate 10 facing the lower substrate. For example, the light shielding film 34 and the black matrix film layer 103 may be formed by one patterning process; and one patterning process, for example, may include but are not limited to coating, masking, exposing, developing and so on, which is not limited in the present disclosure, and other process for forming a desired pattern may be called a patterning process. In this way, a number of patterning processes may be reduced, and production cost is lowered, too.

Figure 3:
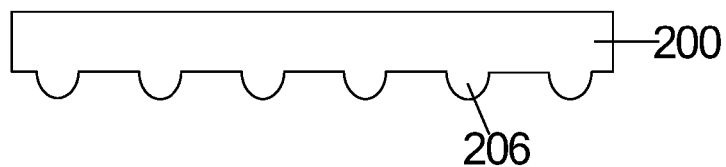
FIG. 3 is a schematic diagram that scattering microstructures of FIG. 2 are protrusions.
Figures 4, 5:
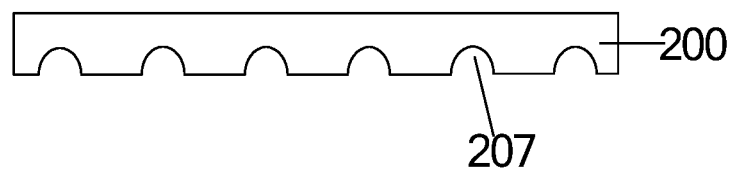
FIG. 4 is a schematic diagram that scattering microstructures of FIG. 2 are grooves.
FIG. 5 is a numeric value diagram of light flux of cone grooves having different apex angles.

For example, the scattering microstructure may be a protrusion or a groove. For example, as shown in FIG. 3, the scattering microstructure may be a protrusion 206. As shown in FIG. 4, the scattering microstructure may be a groove 207.

Further, for example, in order to better improve scattering ability of the scattering microstructure, in a case where the scattering microstructure is a groove, the groove may be filled with other materials having refractive indices different from that of the base substrate.

In addition, in a case where the scattering microstructure is a protrusion, the refractive index of the protrusion may be same as or different from that of the base substrate, which is not limited here.

Further, for example, in order to reduce difficulty of processing, the protrusion or the groove may be of a hemispherical or conical shape.

Even further, for example, in a case where the protrusion or the groove is of a conical shape, an apex angle of a cone is in a range of 90° to 120°. For a conical protrusion or groove having the apex angle of 90° to 120°, light is directly emitted from the upper surface of the base substrate without any more reflection after the light is reflected by the protrusion or groove. For a conical protrusion or groove having any other angle, when light is reflected to the upper surface by the protrusion or groove, part of the light may be reflected back to the base substrate again because of total reflection. When being irradiated to a side surface of the base substrate, the light may be directly emitted out, resulting in loss of light energy, further reducing light utilization efficiency of the backlight.

Here, an example of a conical groove is used to verify the above result. For example, a size of the base substrate is 30mm×20mm×0.4mm, and it is made of PolyMethyl Methacrylate (PMMA), nine LEDs are arranged at one side surface of the base substrate, each LED has a size of 0.4mm×0.4mm×0.1mm, and light flux obtained by a receiving surface corresponding to the conical grooves having different apex angles are shown in FIG. 5. It can be seen from FIG. 5 that, when the apex angle of the cone is 90°, 100° and 120°, the receiving surface receives a maximum total light flux. That is, when the apex angle of the cone is in a range of 90° to 120°, scattering effect of light is best.

An embodiment of the present disclosure further provides a display device, as shown in FIG. 2, comprising a light-emitting body 210 and the display panel according to any one of the embodiments described above, wherein, the light-emitting body 210 is located below a position of the upper substrate 10 protruding out of the lower substrate 20, and arranged on a side position of the base substrate 200 of the lower substrate 20 of the display panel.

It should be noted that, since at least one side of the upper substrate protrudes out of the lower substrate, the light-emitting body may be arranged on the side of the upper substrate protruding out of the lower substrate, or may be arranged on both sides of the upper substrate protruding out of the lower substrate, as long as the light-emitting body is located on a side same as the side of the upper substrate protruding out of the lower substrate, that is, there is the upper substrate disposed above the light-emitting body. A number of the light-emitting bodies and on which side of the lower substrate the light-emitting body is located are not limited here.

In addition, the light-emitting body may be a line light source such as CCFL, or a point light source such as LED, or other light sources, which is not limited here.

An embodiment of the present disclosure further provides a display device, and the display device comprises a light-emitting body and the display panel provided by any embodiment of the present disclosure. By using scattering microstructures arranged on the lower surface of the base substrate of the lower substrate of the display panel, the display device makes light entering the base substrate from the light-emitting body scattered to form a surface light source, and to be emitted from an upper surface of the base substrate, for example, the light is emitted into a polarizing layer. In this way, the display device does not need a light guide plate, as compared with the prior art, a thickness of the display device may be reduced, and production cost may be reduced, too.

For example, the display device may be: a display device such as a liquid crystal display device, E-paper and so on, and a television, a digital camera, a mobile phone, a watch, a tablet personal computer, a notebook computer, a navigator and any other product or component having a display function including these display devices.

Meanwhile, at least one side of the upper substrate protrudes out of the lower substrate, and a position of the light-emitting body corresponds to a position where the upper substrate is protruded out of the lower substrate, that is, the light-emitting body is located below the position where the upper substrate is protruded out of the lower substrate, and arranged on a side surface of the base substrate of the lower substrate of the display panel, so that the upper substrate is arranged above the light-emitting body. Thus, when arranging a frame of the display device, it is possible to prevent the light-emitting body from falling off the base substrate of the lower substrate due to extruding of an upper frame, which can avoid problems of light leakage of the display device and reducing utilization efficiency of a light-emitting diode.

For example, as shown in FIG. 2, the upper substrate 10 and the lower substrate 20 are cell-assembled by a sealant 31. The lower substrate 20 includes a display region 35 and a non-display region 36 connected with at least one side of the display region 35, the display region 35 corresponds to a region within the sealant 31, and a circuit board 37 may be provided in the non-display region 36 for driving the display region 35 to display; and the circuit board 37 and the light-emitting body 210 may be arranged at different sides.

It should be noted that, the first region of the upper substrate corresponds to the display region of the lower substrate, to realize displaying. The light-emitting body and the circuit board may be arranged on a same side, or may be arranged at different sides. For example, in a case where the light-emitting body and the circuit board are arranged on different sides, it is more conducive to processing and fabricating.

Further, for example, as shown in FIG. 2, a first reflective layer 211 covering the protrusions or the grooves may be further arranged on the lower surface 203 of the base substrate 200. In this way, the first reflective layer 211 may reflect light emitted from the lower surface 203 of the base substrate 200 to the base substrate 200, thereby improving brightness of the display device.

It should be noted that, the first reflective layer may be a reflective sheet adhered to the lower surface of the base substrate, or may be a reflective film deposited on the lower surface of the base substrate and covering the protrusions or the grooves. A fabrication process of the reflective sheet is simple, and the reflective film has a small thickness, which may be selected according to actual situation, and is not limited here.

It should be further noted that, the reflective film described above may be made of aluminum (Al), silver (Ag) and other materials, and meanwhile, in order to prevent the reflective film material from being oxidized, an anti-oxidation layer may be further arranged on the reflective film material.

Furthermore, for example, in order to improve utilization efficiency of the light-emitting body and brightness of the display device, a second reflective layer 212 is arranged on a side surface without the light-emitting body of the base substrate.

For example, in the embodiment of the present disclosure, the base substrate 200 may be made of glass.

In a display panel and a display device provided by embodiments of the present disclosure, the display device comprises a light-emitting body and the display panel provided by an embodiment of the present disclosure, by arranging scattering microstructures on the lower surface of the base substrate of the lower substrate of the display panel, light entering the base substrate from the light-emitting body is scattered, and thus, a surface light source is provided to emit light from the upper surface of the base substrate to enter a polarizing layer, in this way, the display device does not need a light guide plate, as compared with the prior art, a thickness of the display device is reduced, and production cost is lowered, too. Meanwhile, at least one side of the upper substrate protrudes out of the lower substrate, and the light-emitting body is located on at least one side of the upper substrate protruding out of the lower substrate, so that the upper substrate is arranged above the light-emitting body; thus, when arranging a frame of the display device, it is possible to prevent the light-emitting body from falling off the base substrate of the lower substrate due to extruding of an upper frame, which can avoid problems of light leakage of the display device and reducing utilization efficiency of a light-emitting diode.

Unless otherwise specified, the technical terms or scientific terms here should be of general meaning as understood by those ordinarily skilled in the art. In the present disclosure, words such as "first", "second" and the like do not denote any order, quantity, or importance, but rather are used for distinguishing different components. Words such as "include" or "comprise" and the like denote that elements or objects appearing before the words of "include" or "comprise" cover the elements or the objects enumerated after the words of "include" or "comprise" or equivalents thereof, not exclusive of other elements or objects.

It should be noted that, the drawings and descriptions of the embodiments of the present disclosure only relate to parts related with the present disclosure, and the other parts may refer to common designs. And respective technical features in the embodiments of the disclosure may be arbitrarily combined for use, in a case of no conflict.

The foregoing is only specific embodiments of the present disclosure, but the protection scope of the present disclosure is not limited thereto. In the technical scope disclosed by the present disclosure, changes or substitutions easily thought by any skilled in the art are all covered in the protection scope of the present disclosure. Therefore, the scope of the present disclosure should be the scope of the following claims.

The application claims priority of Chinese Patent Application No. 201510026122.2 filed on Jan. 19, 2015, the disclosure of which is incorporated herein by reference in its entirety as part of the present application.

The invention claimed is:

1. A display panel, comprising an upper substrate including a first region and a second region, and a lower substrate cell-assembled, the lower substrate including a base substrate, and the base substrate including an upper surface close to the upper substrate and a lower surface opposite to the upper surface, wherein scattering microstructures are arranged on the lower surface of the base substrate, and a display functional layer is arranged on the upper surface of the base substrate; wherein at least one side of the upper substrate protrudes out of the lower substrate, a light-emitting body is located below a position where the upper substrate is protruded from the lower substrate, and arranged at a side surface position of the base substrate of the lower substrate of the display panel, and a light shielding film is arranged on a surface close to the lower substrate in the second region of the upper substrate in a direction protruding out of the lower substrate.

2. The display panel according to claim 1, wherein the upper substrate and the lower substrate are cell-assembled by a sealant, the first region corresponds to a region within the sealant, the second region corresponds to a region outside the sealant, the second region is connected with at least one side of the first region.

3. The display panel according to claim 2, wherein, the light shielding film is arranged on all of surfaces close to the lower substrate in the second region of the upper substrate.

4. The display panel according to claim 3, wherein, a color filter layer and a black matrix film layer are arranged on a surface of the upper substrate facing the lower substrate.

5. The display panel according to claim 2, wherein, a color filter layer and a black matrix film layer are arranged on a surface of the upper substrate facing the lower substrate.

6. The display panel according to claim 5, wherein, the light shielding film and the black matrix film layer are formed by one patterning process.

7. The display panel according to claim 1, wherein the scattering microstructure includes a protrusion.

8. The display panel according to claim 7, wherein the scattering microstructure includes a groove, the groove being filled with other material having refractive index different from that of the base substrate.

9. The display panel according to claim 8, wherein the protrusion or the groove is of hemispherical or cone shape.

10. The display panel according to claim 9, wherein, an apex angle of the cone is in a range of 90° to 120°.

11. The display panel according to claim 1, wherein, a first reflective layer covering the scattering microstructures is arranged on the lower surface of the base substrate.

12. The display panel according to claim 1, wherein the functional layer comprises a polarizing layer, an insulating layer and an array layer arranged on the base substrate in turn.

13. A display device, comprising a light-emitting body and a display panel, wherein the display panel comprises:

an upper substrate including a first region and a second region, and a lower substrate cell-assembled, the lower substrate including a base substrate, and the base substrate including an upper surface close to the upper substrate and a lower surface opposite to the upper surface, wherein scattering microstructures are arranged on the lower surface of the base substrate, and a display functional layer is arranged on the upper surface of the base substrate; wherein at least one side of the upper substrate protrudes out of the lower substrate, a light-emitting body is located below a position where the upper substrate is protruded from the lower substrate, and arranged at a side surface position of the base substrate of the lower substrate of the display panel, and a light shielding film is arranged on a surface close to the lower substrate in the second region of the upper substrate in a direction protruding out of the lower substrate.

14. The display device according to claim 13, wherein, the upper substrate and the lower substrate are cell-assembled by a sealant, the lower substrate includes a display region and a non-display region connected with at least one side of the display region, the display region corresponds to a region within the sealant, a circuit board for driving the display region to display is provided in the non-display region and the circuit board and the light-emitting body are arranged on different sides.

15. The display device according to claim 14, wherein, a second reflective layer is arranged on a side surface without the light-emitting body of the base substrate.

16. The display device according to claim 13, wherein, a second reflective layer is arranged on a side surface without the light-emitting body of the base substrate.

17. The display device according to claim 13, wherein a second reflective layer is arranged on a side surface without the light-emitting body of the base substrate.

* * * * *